United States Patent
Ananthanarayanan et al.

(10) Patent No.: US 6,791,052 B1
(45) Date of Patent: Sep. 14, 2004

(54) METHOD FOR RESISTANCE WELDING A TUBE TO A MEMBER

(75) Inventors: Venkatasubramanian Ananthanarayanan, Beavercreek, OH (US); Dharmendra M. Ramachandra, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/401,716

(22) Filed: Mar. 28, 2003

(51) Int. Cl.[7] ............................................. B23K 11/00
(52) U.S. Cl. ................................. 219/59.1; 219/78.16
(58) Field of Search ......................... 219/59.1, 61.11, 219/78.01, 78.16, 101, 103, 104, 117.1; 285/189, 288.1, 382

(56) References Cited

U.S. PATENT DOCUMENTS

| | | | |
|---|---|---|---|
| 1,292,812 A | * 1/1919 | Lachman | .................... 219/107 |
| 4,676,427 A | * 6/1987 | Constance | ................... 228/189 |
| 4,677,271 A | * 6/1987 | Opprecht | ...................... 219/93 |
| 6,287,513 B1 | 9/2001 | Grady et al. | ................... 419/37 |
| 6,539,837 B2 | 4/2003 | Fanelli et al. | .............. 92/169.3 |
| 6,586,110 B1 | 7/2003 | Obeshaw | ..................... 428/593 |
| 6,615,488 B2 | 9/2003 | Anders et al. | ......... 29/890.053 |
| 6,623,048 B2 | 9/2003 | Castel et al. | ................ 285/382 |
| 6,654,995 B1 | * 12/2003 | Wang et al. | ............... 29/421.1 |

* cited by examiner

Primary Examiner—Kiley Stoner
Assistant Examiner—Kevin P. Kerns
(74) Attorney, Agent, or Firm—Michael D. Smith

(57) ABSTRACT

A method for resistance welding a tube to a member. A tube is obtained having an axially-extending first portion and having a tube form which extends transversely from the first portion. The tube form has at least one axial projection. The tube and the member are positioned with the at-least-one axial projection in contact with the member. A resistance welding current path is created through the member and the tube including the at-least-one axial projection creating a weld zone which includes at least some of the at-least-one axial projection and at least some of the member.

20 Claims, 4 Drawing Sheets

METHOD FOR RESISTANCE WELDING A TUBE TO A MEMBER

TECHNICAL FIELD

The present invention relates generally to welding, and more particularly to a method for resistance welding a tube to a member.

BACKGROUND OF THE INVENTION

Resistance welding (also known as electric-resistance welding) is a known metallurgical process used to weld a right-angle end flange of a tube to a surface projection of a plate wherein metal is heated by its own resistance to a semi-fused (i.e., soft) or fused (i.e., molten) state by the passage of very heavy electric currents for very short lengths of time and then welded. In one known variation, the plate is stamped creating depressions on the top surface and creating surface projections on the bottom surface so that during the resistance welding, the projections soften and/or melt creating a weld nugget which joins together the plate to the tube flange.

Conventional methods for welding a tube to another tube or for welding a tube to a plate include gas metal arc welding. Gas metal arc welding uses a consumable metal wire as one electrode and the parts as another electrode, and moves the consumable metal wire (or the parts) to draw an arc and weld the parts together. The welding is accompanied by a gas (such as a mixture of argon and carbon dioxide) to prevent oxidation and stabilize the arc. Such gas metal arc welding is well known. In a conventional gas metal arc welding technique, solid metal wire or metal core wire (i.e., an annular-solid wire whose core is filled with metal powder such as a mixture of metal, alloy and/or oxide powders) is used with the wire at a positive electrical welding potential and with the parts electrically grounded. The welding arc creates a molten weld puddle which results in the welding together of the parts. A ceramic ferrule is used to contain the weld puddle when needed. Gas metal arc welding requires expensive welding equipment, the molten weld puddle tends to flow away from the joint area (depending on the joint position with respect to gravity) resulting in welds of inconsistent quality, and the process requires a long cycle time between welds.

Conventional methods for attaching parts together also include friction welding. To join two tubes together end to end, one of the tubes is rotated about its longitudinal axis, and the tube ends are pressed together, wherein friction causes heating of the ends creating the weld. To join a tube to a plate, the tube is rotated about its longitudinal axis, and the tube end and the plate are pressed together, wherein friction causes heating creating the weld. Friction welding requires expensive welding equipment, and the process requires a long cycle time between welds. Friction welding is not easily applicable to thin-walled tubes because they do not retain their shapes well under heat and pressure. It is noted that laser and electron-beam welding for the above joints also need expensive equipment and expensive joint preparation.

What is needed is a less expensive method for metallurgically joining a tube to a member.

SUMMARY OF THE INVENTION

A first method of the invention is for resistance welding a tube to a member and includes steps a) through d). Step a) includes obtaining a tube having an axially-extending first portion and having a tube form which extends transversely from the first portion, wherein the tube form includes at least one axial projection. Step b) includes obtaining a member. Step c) includes, after steps a) and b), positioning the tube and the member with the at-least-one axial projection contacting the member. Step d) includes, after step c), creating a resistance welding current path through the member and the tube including the at-least-one axial projection creating a weld zone which includes at least some of the at-least-one axial projection and at least some of the member.

A second method of the invention is for resistance welding a tube to a member and includes steps a) through d). Step a) includes obtaining a tube having an axially-extending first portion and having a tube form which extends transversely from the first portion, wherein the tube form includes at least one axial projection. Step b) includes obtaining a member. Step c) includes, after steps a) and b), positioning the tube and the member with the at-least-one axial projection contacting the member. Step d) includes, after step c), creating a resistance welding current path through the member and the tube including the at-least-one axial projection and relatively axially moving the at-least-one axial projection deformingly against the member creating a weld zone which includes at least some of the at-least-one axial projection and at least some of the member.

Several benefits and advantages are derived from one or more of the methods of the invention. The tube form allows resistance welding of a tube to a member to be commercially feasible, as can be appreciated by those skilled in the art. The at-least-one axial projection enables the welding of thick-thin part combinations and allows a smaller welding current to be used since all of the welding current creating the weld zone flows only through the projection(s) and not through a larger area. Resistance welding is less expensive than gas metal arc welding or friction welding. Resistance welding also has a shorter cycle time between welds than gas metal arc welding or friction welding.

DESCRIPTION OF THE PREFERRED EMBODIMENTS

Figure 1:
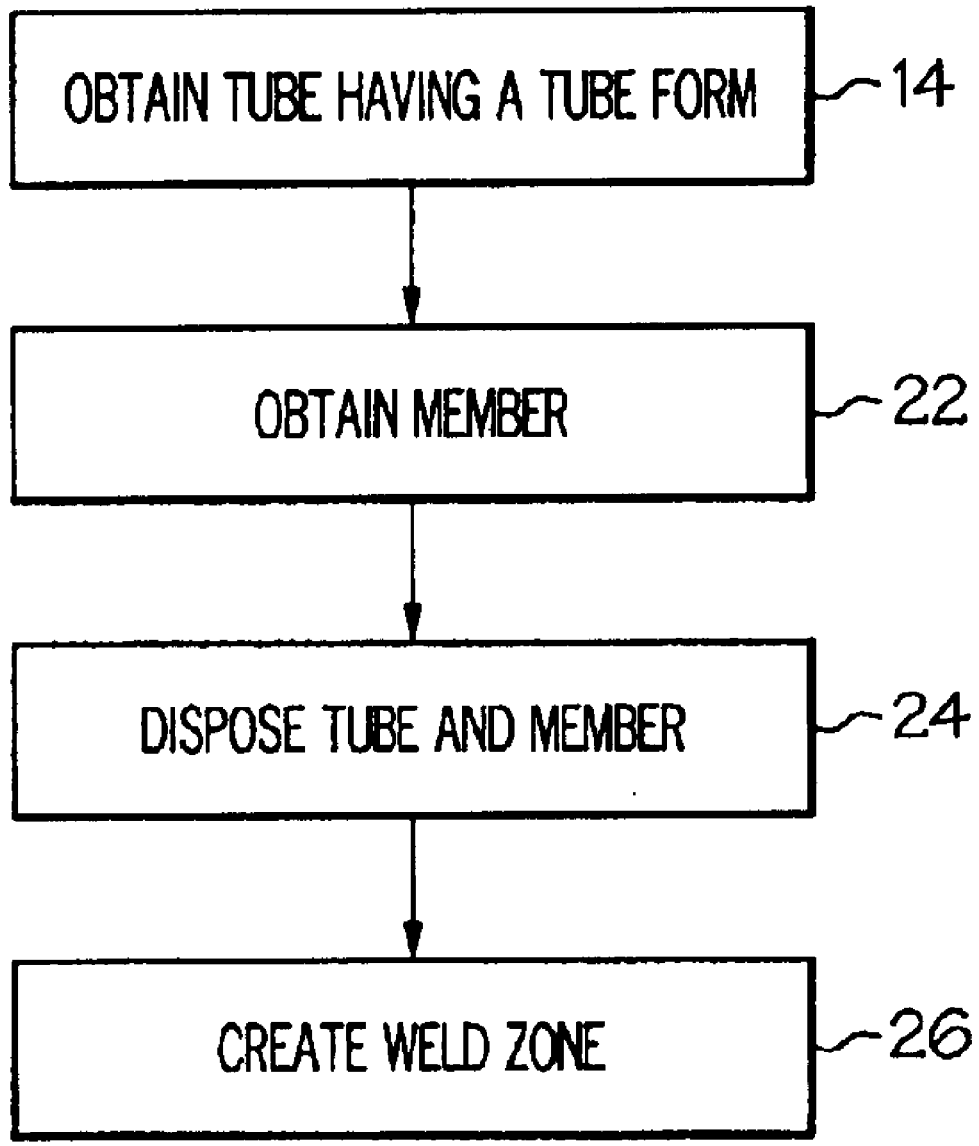
FIG. 1 is a block diagram of a first method of the invention for resistance welding a tube to a member.
Figure 2:
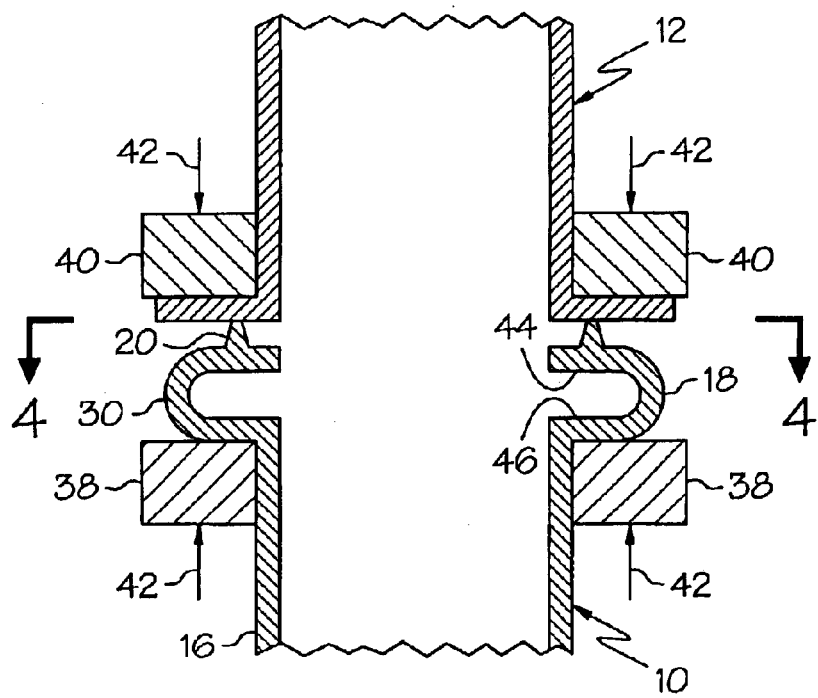
FIG. 2 is a schematic, side cross-sectional view of a first embodiment of a tube and a member (which is another tube) used in a first example of the first method, showing the tubes just before welding.
Figure 3:
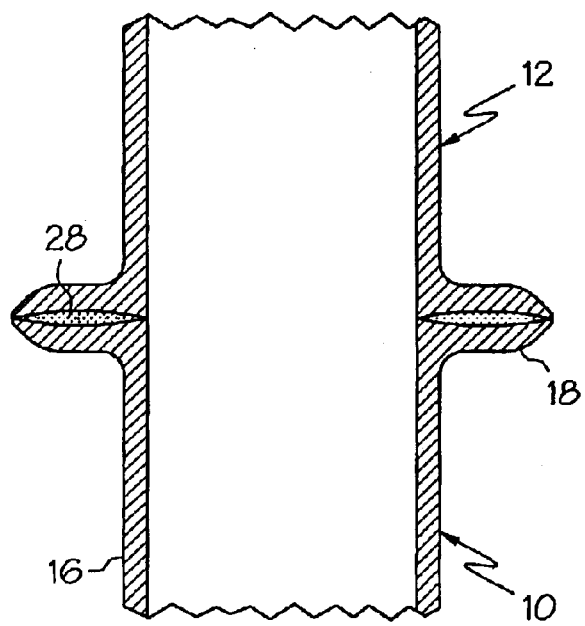
FIG. 3 is a view, as in FIG. 2, but showing the two tubes after welding and with the welding electrodes removed.

A first method of the invention is for resistance welding a tube 10 to a member 12 and is shown in block diagram form in FIG. 1 with a first embodiment of the tube 10 and the member 12 shown in FIGS. 2 and 3. The first method includes steps a) through d). Step a) is labeled as "Obtain Tube Having A Tube Form" in block 14 of FIG. 1. Step a) includes obtaining a tube 10 having an axially-extending first portion 16 and having a tube form 18 which extends transversely from the first portion 16, wherein the tube form 18 includes at least one axial projection 20. Step b) is labeled as "Obtain Member" in block 22 of FIG. 1. Step b) includes obtaining a member 12. Step c) is labeled as "Dispose Tube and Member" in block 24 of FIG. 1. Step c) includes, after steps a) and b), disposing the tube 10 and the member 12 with the at-least-one axial projection 20 contacting the member 12. Step d) is labeled as "Create Weld Zone" in block 26 of FIG. 1. Step d) includes, after step c), creating a resistance welding current path through the member 12 and the tube 10 including the at-least-one axial projection 20 creating a weld zone 28 which includes at least some of the at-least-one axial projection 20 and at least some of the member 12.

In one example of the first method, the member 12 is a tubular member as shown in FIGS. 2 and 3. In one modification, the weld zone 28 extends the width of the tube form 18 as can be seen in FIG. 3. In another modification, not shown, the weld zone extends the width of the axial projection 20. In one variation, not shown, a portion of the tube above the tube form extends inside the tubular member. In a different example, the member is a non-tubular member. In one variation, the member is a plate (without a hole or with a hole in which the tube is partially disposed). In another variation, the member is a thicker solid. Other modifications, variations, and the choice of weldable materials making up the tube and the member, are left to the artisan.

In one construction using the first method, the tube 10 is a substantially circular tube. In one variation, the tube 10 is a completely straight tube. In another variation, the tube is a bent or otherwise non-straight tube. In one modification, the tube is a long tube. In another modification, the tube is a short tubular connector. It is noted that a tube axially extends along its centerline and that the length of a tube is the distance along its centerline whether the centerline is straight or not. Other constructions, variations, and modifications of the tube are left to the artisan.

In one embodiment using the first method, the tube form 18 is disposed proximate an end of the tube 10 as shown in FIG. 2. The term "proximate" includes "at". In a different embodiment, the tube form is disposed elsewhere on the tube than proximate an end of the tube. In one variation of this different embodiment, the first method resistance welds a tube to a plate wherein the plate has a through hole and wherein the tube extends both above and below the plate. Other embodiments and variations are left to the artisan.

In one enablement of the first method, the tube form 18 is a fold 30 as shown in FIG. 2. A "fold" is a fold of the tube wall of a portion of the tube. The fold may or may not include axially-spaced-apart first and second fold portions. In one variation, the fold is an annular fold. In one modification, the fold is an outwardly-extending annular fold. In a different enablement, the tube form 18 is a flange. For purposes of describing any of the methods, a flange is a tube form which does not include a fold. In one variation, the flange is an annular flange. In one modification, the flange is an outwardly-extending annular flange. Other annular and non-annular tube forms, including inwardly-extending (or both inwardly and outwardly-extending) tube forms, are left to the artisan.

In one enablement of the first method, the tube form 18 is a monolithic portion of the tube 10 and the at-least-one axial projection 20 is a monolithic portion of the tube form 18, wherein the at-least-one axial projection 20 was created during the creation of the tube form 18. In one technique, conventional tube forming methods are used to create the tube form 18 such as by surrounding the tube 10 with a die having a tube-form-shaped recess, supporting the inside of the tube 10 with a solid cylinder, and pushing against the ends of the tube 10 to force a portion of the tube 10 into the recess to create the tube form 18 including the at-least-one axial projection 20. In another technique, the tube 10 is created by pouring molten metal into a tube mold which is shaped to create the tube form 18 including the at-least-one axial projection 20. Other enablements and techniques are left to the artisan.

Figure 4:
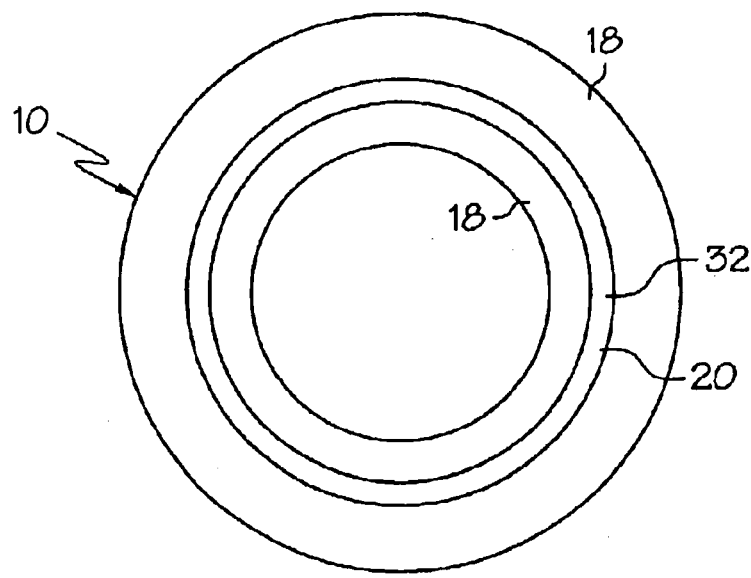
FIG. 4 is a view along lines 4—4 in FIG. 2 showing a first shape of the at-least-one axial projection with the welding electrodes removed.
Figure 5:
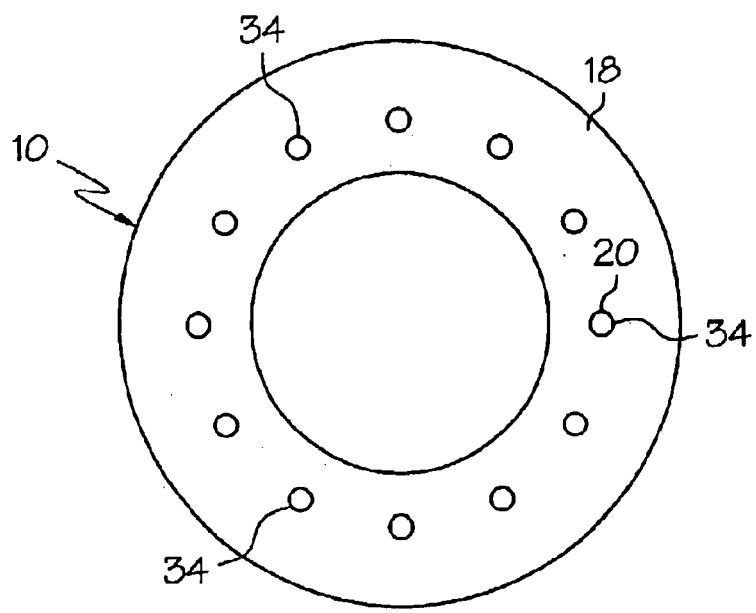
FIG. 5 is a view, as in FIG. 4, but showing a second shape of the at-least-one axial projection.
Figure 6:
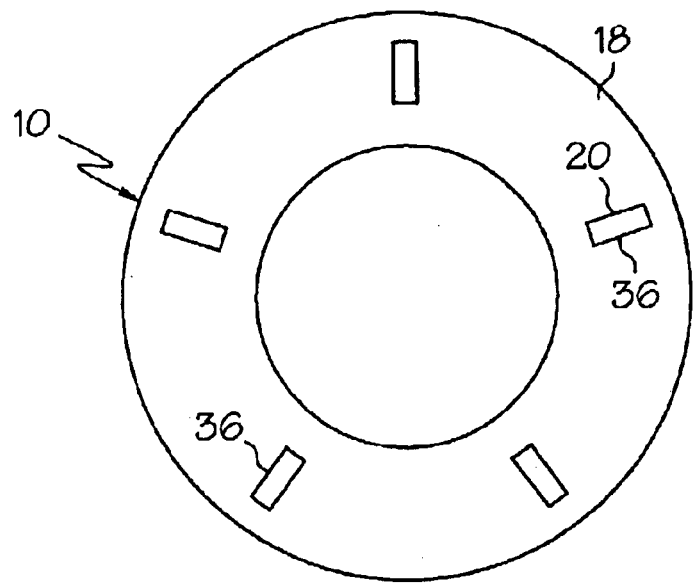
FIG. 6 is a view, as in FIG. 4, but showing a third shape of the at-least-one axial projection.

In one axial-projection design using the first method, the tube form 18 is an annular tube form, and the at-least-one axial projection 20 is a single annular axial projection 32 shown in the example of FIG. 4. In alternate designs, the at-least-one axial projection 18 includes a plurality of spaced-apart axial projections 34 and 36 shown in the examples of FIGS. 5 and 6. Other designs of the at-least-one axial projection 20 are left to the artisan.

FIG. 2 shows one electrode choice which can be used in a conventional resistance welding machine to perform the first method. In this choice, first and second electrodes 38 and 40 are used. The first electrode 38 is an annular (e.g., a one or two or more piece annular) electrode disposed axially against the tube form 18 on a surface of the tube form 18 opposite the at-least-one axial projection 20. The second electrode 40 is an annular electrode disposed as shown in FIG. 2.

In one technique using the first method, step d) is performed without relatively axially moving the at-least-one axial projection 20 deformingly against the member 12. In another technique step d) includes relatively axially moving the at-least-one axial projection 20 deformingly against the member 12. It is noted that the resistance welding of step d) is with or without the application of deforming pressure when the metal to be welded is melted and that the resistance welding of step d) is with the application of deforming pressure when the metal to be welded is only softened. Even when not applying deforming pressure, the tube 10 and the member 12 typically would be moved toward each other to maintain the resistance welding current path during step d).

In one option using the first method, the weld zone 28 created by step d) is a leak-tight annular weld zone. It is noted that a single non-annular axial projection or a plurality of widely spaced apart axial projections is unlikely to result in a leak-tight annular weld zone. A non-leak-tight weld zone is satisfactory for particular welding applications as can be appreciated by the artisan.

A second method of the invention is for resistance welding a tube 10 to a member 12 and includes steps a) through d). Step a) includes obtaining a tube 10 having an axially-extending first portion 16 and having a tube form 18 which extends transversely from the first portion 16, wherein the tube form 18 includes at least one axial projection 20. Step b) includes obtaining a member 12. Step c) includes, after steps a) and b), disposing the tube 10 and the member 12 with the at-least-one axial projection 20 contacting the member 12. Step d) includes, after step c), creating a resistance welding current path through the member 12 and the tube 10 including the at-least-one axial projection 20 and relatively axially moving the at-least-one axial projection 20 deformingly against the member 12 creating a weld zone 28 which includes at least some of the at-least-one axial projection 20 and at least some of the member 12. By "relatively moving" a first piece against a second piece is meant moving the first piece against the second piece or moving the second piece against the first piece or moving both pieces against each other.

In one procedure involving the second method, the first and second electrodes 38 and 40 are relatively axially moved towards each other during step d) along lines of movement indicated by arrows 42 in FIG. 2.

In one enablement of the first method, the tube form 18 is a fold 30 as shown in FIG. 2. In one variation, the fold 30 includes axially-spaced-apart first and second fold portions 44 and 46. In a different enablement, the tube form 18 is a flange. Other tube forms are left to the artisan. It is noted that the optional examples, variations, modifications, etc. of the first method are equally applicable to the second method.

Figure 7:
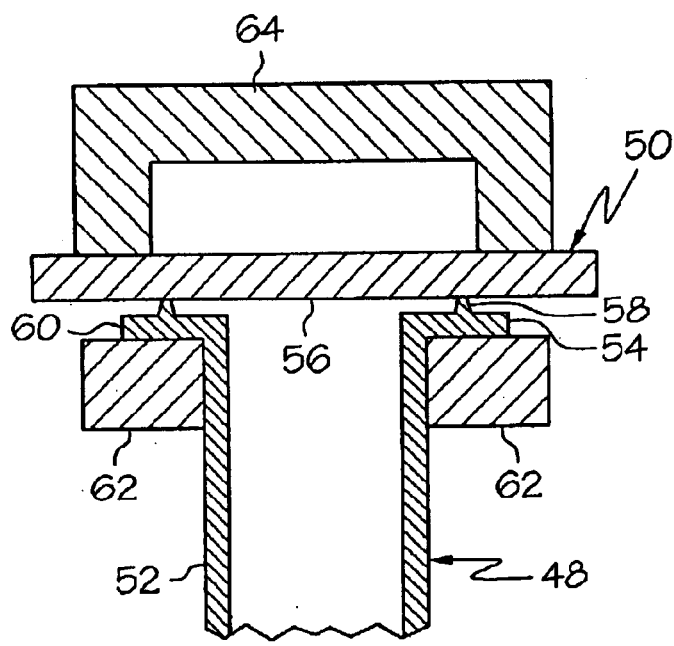
FIG. 7, is a view, as in FIG. 2, but showing a second embodiment of a tube and a member (which is a plate) used in a second example of the first method, showing the tube and the plate just before welding.

FIG. 7 shows a second embodiment of a tube 48 and a member (which is a plate 50) used in a second example of the first and/or second methods, showing the tube 48 and the plate 50 just before welding. In this embodiment, the tube form 54 is a flange 60. As shown in FIG. 7, the tube form 54 of the axially-extending first portion 52 of the tube 48 has the at-least-one axial projection 58 in contact with a surface 56 of the plate 50 just before welding. In one technique using this embodiment, a first electrode 62 and an annular second electrode 64 are employed as shown in FIG. 7. It is noted that the optional examples, etc of the first method, and the deformation resistance welding step d) of the second method are equally applicable to this embodiment. It is also noted that projections may be employed on both the tube and the member in any of the methods and embodiments.

Several benefits and advantages are derived from one or more of the methods of the invention. The tube form allows resistance welding of a tube to a member to be commercially feasible, as can be appreciated by those skilled in the art. The at least one axial projection enables the welding of thick-thin part combinations and allows a smaller welding current to be used since all of the welding current creating the weld zone flows only through the projection(s) and not through a larger area. Resistance welding is less expensive than gas metal arc welding or friction welding. Resistance welding also has a shorter cycle time between welds than gas metal arc welding or friction welding.

The foregoing description of a several methods of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

What is claimed is:

1. A method for resistance welding a tube to a member comprising the steps of:
    a) obtaining a tube having an axially-extending first portion with a longitude axis and having a tube form which extends from the first portion substantially perpendicular to the longitudinal axis, wherein the tube form includes at least one projection substantially parallel to the longitudinal axis;
    b) obtaining a member;
    c) after steps a) and b), disposing the tube and the member with the at-least-one projection contacting the member; and
    d) after step c), creating a resistance welding current path through the member and the tube including the at-least-one projection creating a weld zone which includes at least some of the at-least-one projection and at least some of the member, wherein the member is a tubular member.

2. The method of claim 1, wherein the tube form is a flange.

3. The method of claim 1, wherein the tube form is a fold.

4. The method of claim 1, wherein the at-least-one projection is a single annular axial projection.

5. The method of claim 1, wherein the at-least-one projection includes a plurality of spaced-apart axial projections.

6. The method of claim 1, wherein the tube form is a monolithic portion of the tube, wherein the at-least-one projection is a monolithic portion of the tube form, and wherein the at-least-one projection was created during the creation of the tube form.

7. A method for resistance welding a tube to a member comprising the steps of:
    a) obtaining a tube having an axially-extending first portion and having a tube form which extends transversely from the first portion, wherein the tube form is a fold and wherein the tube form includes at least one axial projection;
    b) obtaining a member;
    c) after steps a) and b), disposing the tube and the member with the at-least-one axial projection contacting the member; and
    d) after step c), creating a resistance welding current path through the member and the tube including the at-least-one axial projection creating a weld zone which includes at least some of the at-least-one axial projection and at least some of the member.

8. The method of claim 7, wherein the fold is an annular fold.

9. The method of claim 8, wherein the fold is an outwardly-extending annular fold.

10. The method of claim 7, wherein the at-least-one axial projection is a single annular axial projection.

11. The method of claim 7, wherein the at-least-one axial projection includes a plurality of spaced-apart axial projections.

12. The method of claim 7, wherein the tube form is a monolithic portion of the tube, wherein the at-least-one axial projection is a monolithic portion of the tube form, and wherein the at-least-one axial projection was created during the creation of the tube form.

13. A method for resistance welding a tube to a member comprising the steps of:
    a) obtaining a tube having an axially-extending first portion and having a tube form which extends transversely from the first portion, wherein the tube form includes at least one axial projection;
    b) obtaining a member;
    c) after steps a) and b), disposing the tube and the member with the at-least-one axial projection contacting the member; and
    d) after step c), creating a resistance welding current path through the member and the tube including the at-least-one axial projection creating a weld zone which includes at least some of the at-least-one axial projection and at least some of the member, wherein the at-least-one axial projection includes a plurality of spaced-apart axial projections.

14. The method of claim 13, wherein the member is a tubular member and wherein the tube form is a fold.

15. The method of claim 13, wherein the member is a tubular member and wherein the tube form is a flange.

16. The method of claim 13, wherein the member is a non-tubular member.

17. The method of claim 16, wherein the tube form is a flange.

18. The method of claim 16, wherein the tube form is a fold.

19. The method of claim 13, wherein the tube form is a monolithic portion of the tube, wherein the at-least-one axial projection is a monolithic portion of the tube form, and wherein the at-least-one axial projection was created during the creation of the tube form.

20. A method for resistance welding a tube to a member comprising the steps of:

a) obtaining a tube having an axially-extending first portion and having a tube form which extends transversely from the first portion, wherein the tube form includes at least one axial projection;

b) obtaining a member;

c) after steps a) and b), disposing the tube and the member with the at-least-one axial projection contacting the member; and d) after step c), creating a resistance welding current path through the member and the tube including the at-least-one axial projection and relatively axially moving the at-least-one axial projection deformingly against the member creating a weld zone which includes at least some of the at-least-one axial projection and at least some of the member, wherein the tube form is a fold.

* * * * *